United States Patent
Quirion et al.

(10) Patent No.: US 7,463,464 B2
(45) Date of Patent: Dec. 9, 2008

(54) METHOD AND APPARATUS FOR SENSING BRUSHLESS DC MOTOR AVERAGE CURRENT FROM OVERCURRENT PROTECTION CIRCUITRY

(75) Inventors: Jean P. Quirion, Upper Tantallon (CA); Joel Kuehner, Upper Sackville (CA)

(73) Assignee: International Rectifier Corporation, El Segundo, CA (US)

(*) Notice: Subject to any disclaimer, the term of this patent is extended or adjusted under 35 U.S.C. 154(b) by 147 days.

(21) Appl. No.: 11/463,196

(22) Filed: Aug. 8, 2006

(65) Prior Publication Data
US 2007/0040523 A1  Feb. 22, 2007

Related U.S. Application Data

(60) Provisional application No. 60/706,962, filed on Aug. 10, 2005.

(51) Int. Cl.
*H02H 7/08* (2006.01)
(52) U.S. Cl. .............. 361/31; 361/23; 361/87; 323/274; 323/284; 318/432; 318/434
(58) Field of Classification Search .......... 318/432, 318/434; 361/31, 23, 87; 323/274, 284
See application file for complete search history.

(56) References Cited

U.S. PATENT DOCUMENTS

| 4,446,498 | A | * | 5/1984 | Stich | 361/87 |
| 4,500,820 | A | * | 2/1985 | Noto et al. | 318/139 |
| 5,079,494 | A | * | 1/1992 | Reichard | 318/811 |
| 5,675,231 | A | * | 10/1997 | Becerra et al. | 318/801 |
| 2003/0107863 | A1 | * | 6/2003 | Kelwaski | 361/93.9 |

* cited by examiner

*Primary Examiner*—Rita Leykin
(74) *Attorney, Agent, or Firm*—Ostrolenk, Faber, Gerb & Soffen, LLP

(57) ABSTRACT

A method and an apparatus that permit the measurement of the motor average current directly from the output of the amplifier and filter stage used for instantaneous dc-link overcurrent protection. As such, only one amplifier and filter stage is sufficient to provide both the motor average current and instantaneous dc-link overcurrent protection. The invention permits the suppression of the amplifier and filter stage that is typically used to derive the motor average current directly from the dc-link current.

14 Claims, 4 Drawing Sheets

METHOD AND APPARATUS FOR SENSING BRUSHLESS DC MOTOR AVERAGE CURRENT FROM OVERCURRENT PROTECTION CIRCUITRY

CROSS REFERENCE TO RELATED APPLICATIONS

This application is based upon and claims priority of U.S. Provisional Ser. No. 60/706,962 filed Aug. 10, 2005 (IR-3046 PROV), incorporated by reference.

It is related to U.S. Provisional Ser. No. 60/706,956 filed Aug. 10, 2005 (IR-3047 PROV), and its corresponding U.S. non-provisional application Ser. No. 11/463,185, IR-3047 (2-5454), filed on even date herewith, also incorporated by reference.

BACKGROUND OF THE INVENTION

1. Field of the Invention

The present invention relates to a method and apparatus for sensing brushless DC average motor current, and more particularly to a method and apparatus which sense average motor current from over current protection circuitry.

2. Related Art

In the design of brushless DC motor drive systems, there is often a requirement to sense the motor average current. Effectively, the motor average current is the average current being drawn from the input power supply by the motor drive system. In brushless DC motor drive systems that are employed for safety-critical applications, such as but not restricted to electro-hydraulic power steering systems, knowledge of the motor average current can be used by the microcontroller for protecting the motor. For example, the microcontroller can control the motor such as to limit its average current to a specific maximum value. This maximum value can be derived based on the maximum current rating of the motor.

FIG. 1 shows a typical apparatus used for sensing the average motor current in a brushless DC motor drive system 10.

In FIG. 1, the dc-link current idc is measured using a current sensor 12. For example, this current sensor can be a dc-link shunt resistor, a Hall effect current sensor, etc. An amplifier and filter stage 30, with a very heavy filter (e.g. 0-10 Hz bandwidth), is used to amplify and filter the dc-link current and obtain the motor average current. The resulting motor average current signal can then be sampled by the microcontroller 20 and used for protecting the motor.

In brushless DC motor drive systems that are employed for safety-critical applications, such as but not restricted to electro-hydraulic power steering systems, there is often an additional requirement to sense the instantaneous dc-link current and use it for protecting the system power components against over current conditions. A typical circuit used to detect instantaneous over current conditions is also shown in FIG. 1. In this case, an amplifier and filter stage 14 with a light filter (e.g. 0-20 KHz bandwidth) appropriately conditions the measured dc-link current. The output of the amplifier and filter stage is a pulsating voltage that represents the instantaneous dc-link current. This voltage is then presented to multiple comparators 16a, 16b, . . . , 16n. Each comparator compares the instantaneous dc-link current to a specific threshold that represents an instantaneous current level deemed more or less dangerous. If the output of a comparator switches, then the microcontroller immediately becomes advised of an over current condition. In such case, as a means for protection, the microcontroller turns off all inverter switches for the remainder of the PWM cycle thereby effectively reducing the PWM duty cycle.

Thus, typically, two amplifier and filter stages 14 and 30 are used to condition the dc-link current. One stage 30 is used to derive the motor average current and the other stage 14 is used for instantaneous dc-link over current protection.

The requirement of two amplifier and filter stages for average current sensing and instantaneous dc-link over current protection can be expensive in cost-sensitive applications, such as but not restricted to electro-hydraulic power steering systems.

SUMMARY OF THE INVENTION

Disclosed herein are a method and an apparatus that permit the measurement of the motor average current directly from the output of the amplifier and filter stage used for instantaneous dc-link over current protection. As such, only one amplifier and filter stage is used to provide both the motor average current and instantaneous dc-link over current protection. The invention permits the suppression of the amplifier and filter stage that is typically used to derive the motor average current directly from the dc-link current. The invention thereby provides a significant system cost reduction.

Other features and advantages of the present invention will become apparent from the following description of embodiments of the invention which refers to the accompanying drawings.

DETAILED DESCRIPTION OF EMBODIMENTS OF THE INVENTION

Figure 1:
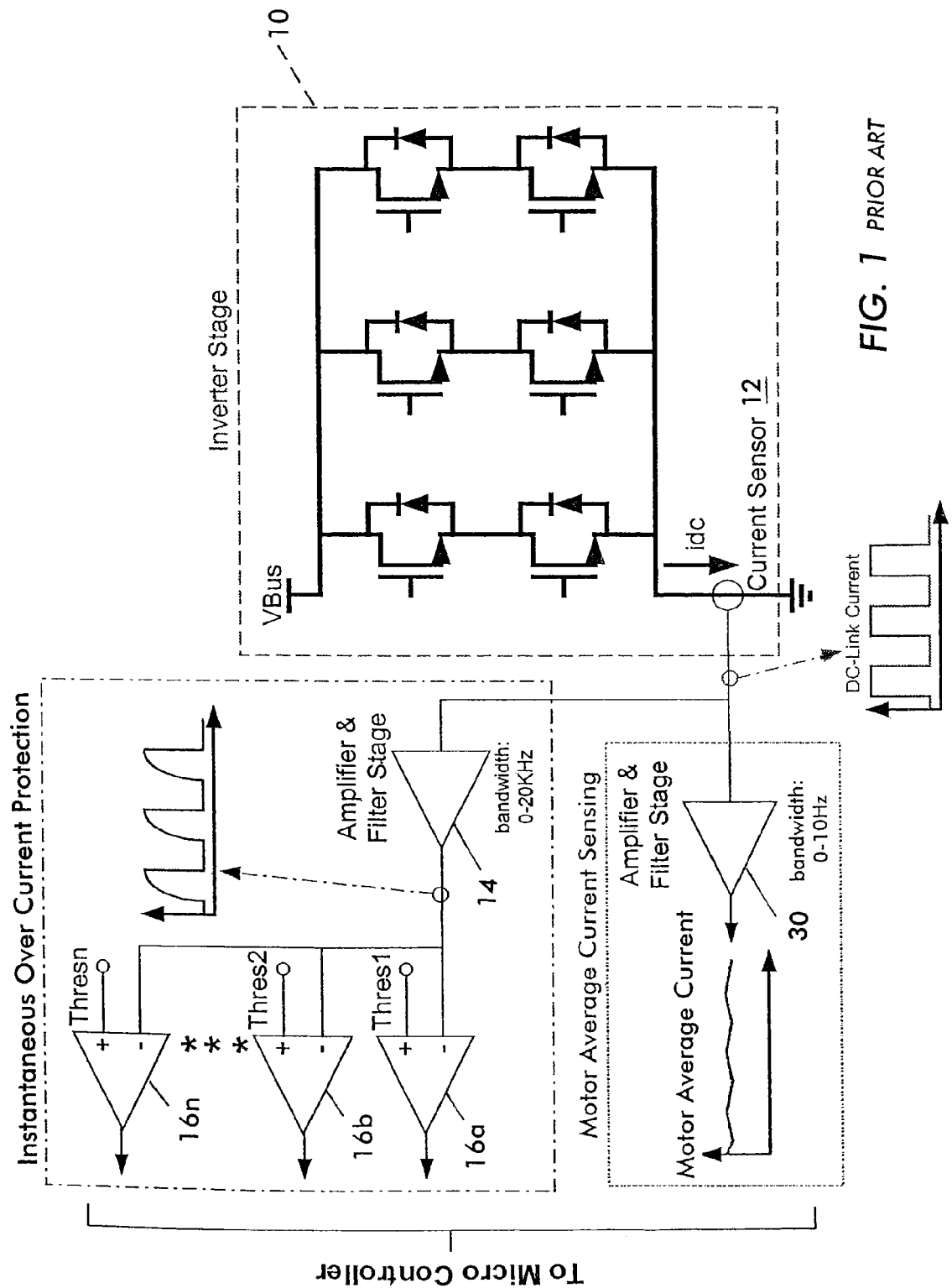
FIG. 1 is a schematic diagram of a known apparatus for sensing average motor current.
Figure 2:
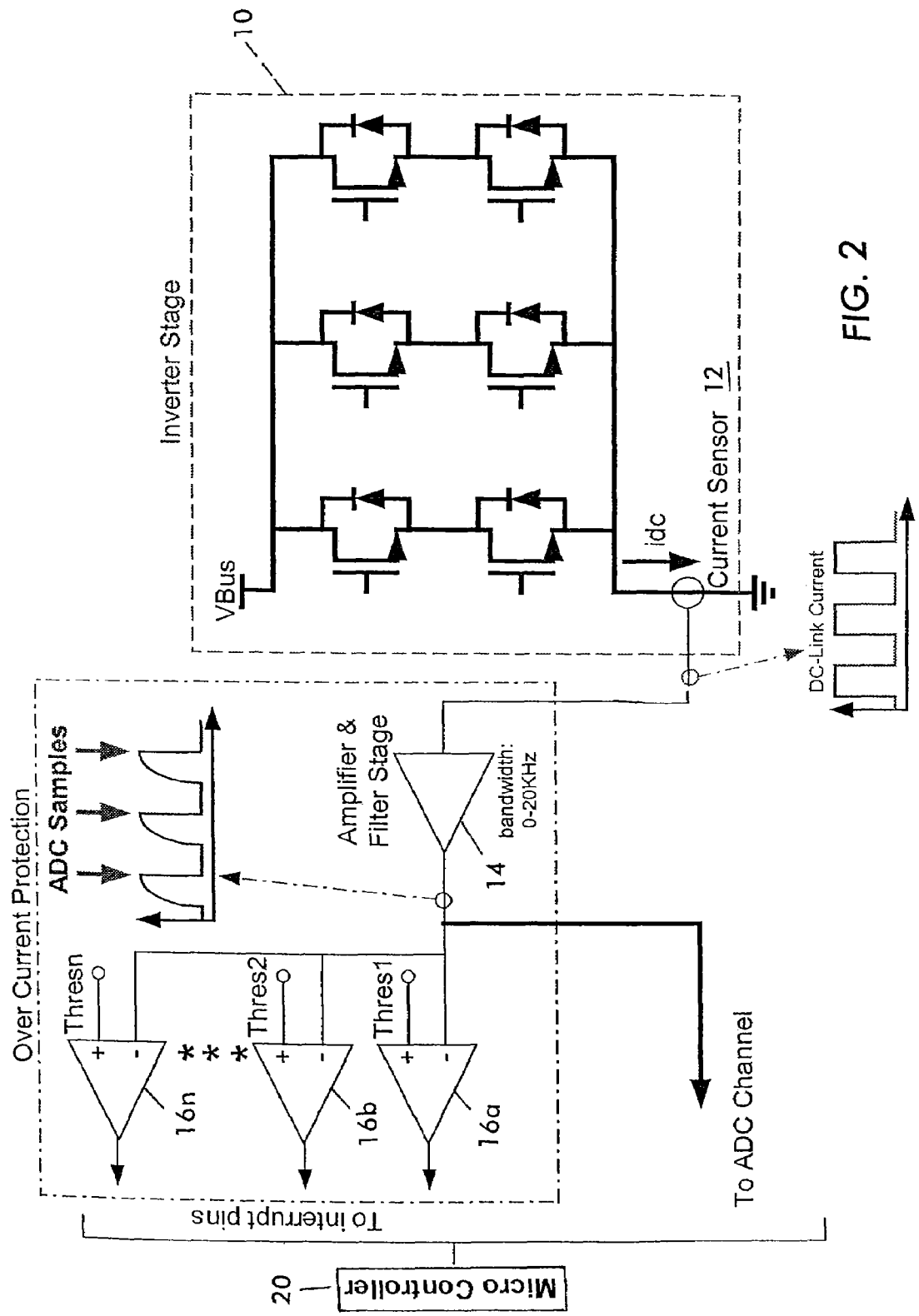
FIG. 2 is a schematic diagram of an apparatus for sensing average motor current according to an embodiment of the invention.

The Apparatus:

An example of an apparatus which may be used for sensing the motor average from the over current circuitry is shown in FIG. 2.

In FIG. 2, the 10 Hz amplifier and filter stage 30 that was used to measure the motor average current in the prior art scheme is not needed. Instead, the output of the amplifier and filter stage 14 used for detecting instantaneous dc-link over current conditions is routed to an ADC channel of the microcontroller 20. In addition to specifically a microcontroller, any other control device or equipment that is operable to carry out the invention may used as well.

As shown in FIG. 2, the microcontroller is programmed to sample only the peaks of the dc-link current signal (i.e. the peak values of the output of the amplifier and filter stage 14). The filtering of the resulting current samples, and thereby the calculation of the motor average current, is performed in software by the microcontroller 20 using the method described below.

In addition to routing the output of the amplifier and filter stage 14 to an ADC channel of the microcontroller 20, the outputs of the comparators are routed to interrupt pins of the microcontroller 20. This allows the software to become aware of when, within a PWM cycle, the microcontroller turns off all inverter switches for the remainder of that PWM cycle. As mentioned above, this is typically done in order to protect the power components against instantaneous dc-link over current conditions.

The Method:

The current samples resulting from the sampling scheme described above are used to calculate the motor average current. In one example of a calculating method, this can be done by multiplying these samples by the operating PWM duty cycle, before adding filtering and gain/offset correction. This exemplary method is shown in FIG. 3.

Figure 3:
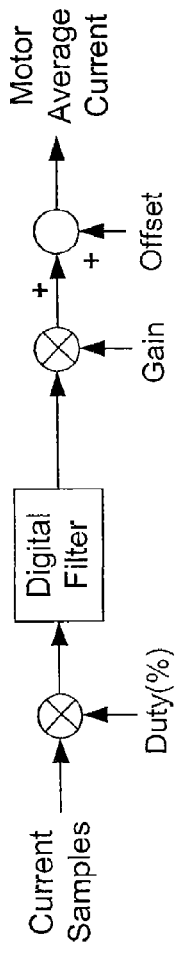
FIG. 3 is a diagram illustrating a method for calculating average motor current.

In FIG. 3, the current samples are multiplied by the PWM duty cycle (i.e. the value of Duty in percentage points) before being digitally filtered. The filter removes noise and other non-linear effects. The filter can be, for example, an infinite impulse response (IIR) filter or a finite impulse response (FIR) filter. A gain and offset correction is then applied to the output of the filter. The gain and offset values are fixed and are obtained via calibration. The resulting signal is the motor average current.

The value of Duty, in FIG. 3, can originate from two sources. During a PWM cycle, if no instantaneous dc-link over current conditions were detected (i.e. the outputs of the comparators in FIG. 2 have not switched), then Duty in FIG. 3 is simply equal to the PWM duty cycle used by the software for normal motor commutation. However, if an instantaneous dc-link over current condition has been detected (i.e. one or more comparators in FIG. 2 have switched), then the value of Duty in FIG. 3 is calculated as follows:

Immediately upon detecting an instantaneous dc-link over current condition, the value of the PWM timer is read by the software. This value is then divided by the PWM timer period. If the resulting quotient is smaller than the software PWM duty cycle used for normal motor commutation, then this resulting quotient is used as the value of Duty in FIG. 3. Otherwise, Duty remains equal to the software PWM duty cycle used for normal motor commutation.

Figure 4:
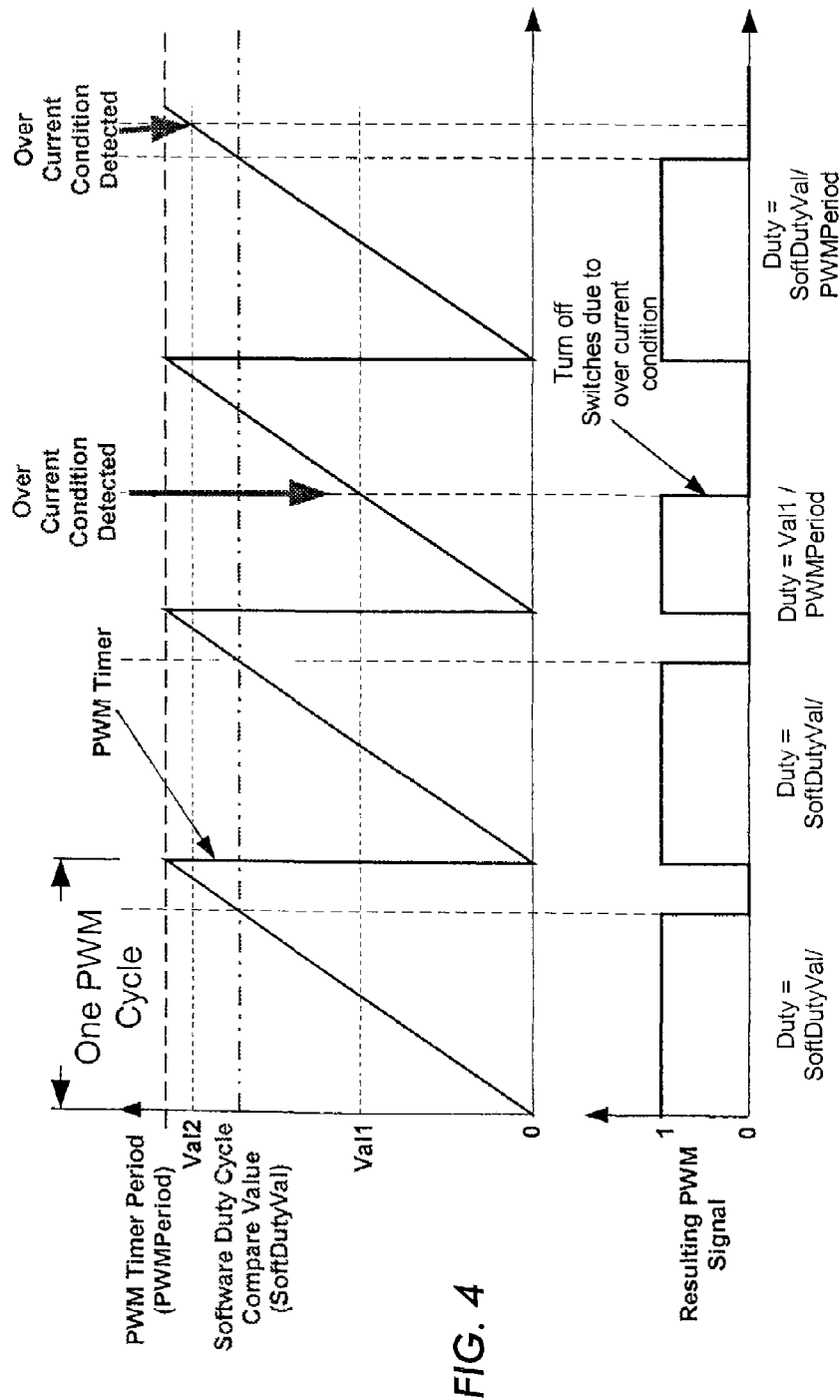
FIG. 4 is a graph illustrating an example of how a duty value is assigned.

FIG. 4 illustrates the manner by which the value of Duty is assigned in the presence of an instantaneous dc-link over current condition.

FIG. 4 illustrates four PWM cycles. In the first two cycles, no instantaneous dc-link over current conditions are detected by the comparators of FIG. 2. In such case, the value of Duty in FIG. 3 is simply equal to the software PWM duty cycle used for normal motor commutation. In other words, the value of Duty is equal to the software duty cycle compare value divided by the PWM timer period.

However, in the third and fourth PWM cycles of FIG. 4, instantaneous dc-link over current conditions are detected. In those cases, as soon as the over current conditions are detected, the PWM signal is set low to cause the switches of the inverter to turn off. This is done as a means for protection.

At the same time, the value of the PWM timer is read and divided by PWMPeriod. During the third PWM cycle, the result of this division is smaller than the software PWM duty cycle. Therefore, Duty is equal to Val1/PWMPeriod. During the last PWM cycle, however, the resulting division is larger than the software PWM duty cycle. Therefore, the value of Duty remains equal to the software PWM duty cycle.

As soon as an instantaneous dc-link over current condition is detected, the microcontroller turns off all inverter switches for the remainder of the PWM cycle. Therefore, the duty cycle effectively gets limited for protection purposes. This is why the value of Duty, in FIG. 3, is adjusted to appropriately calculate the motor average current.

Figure 5:
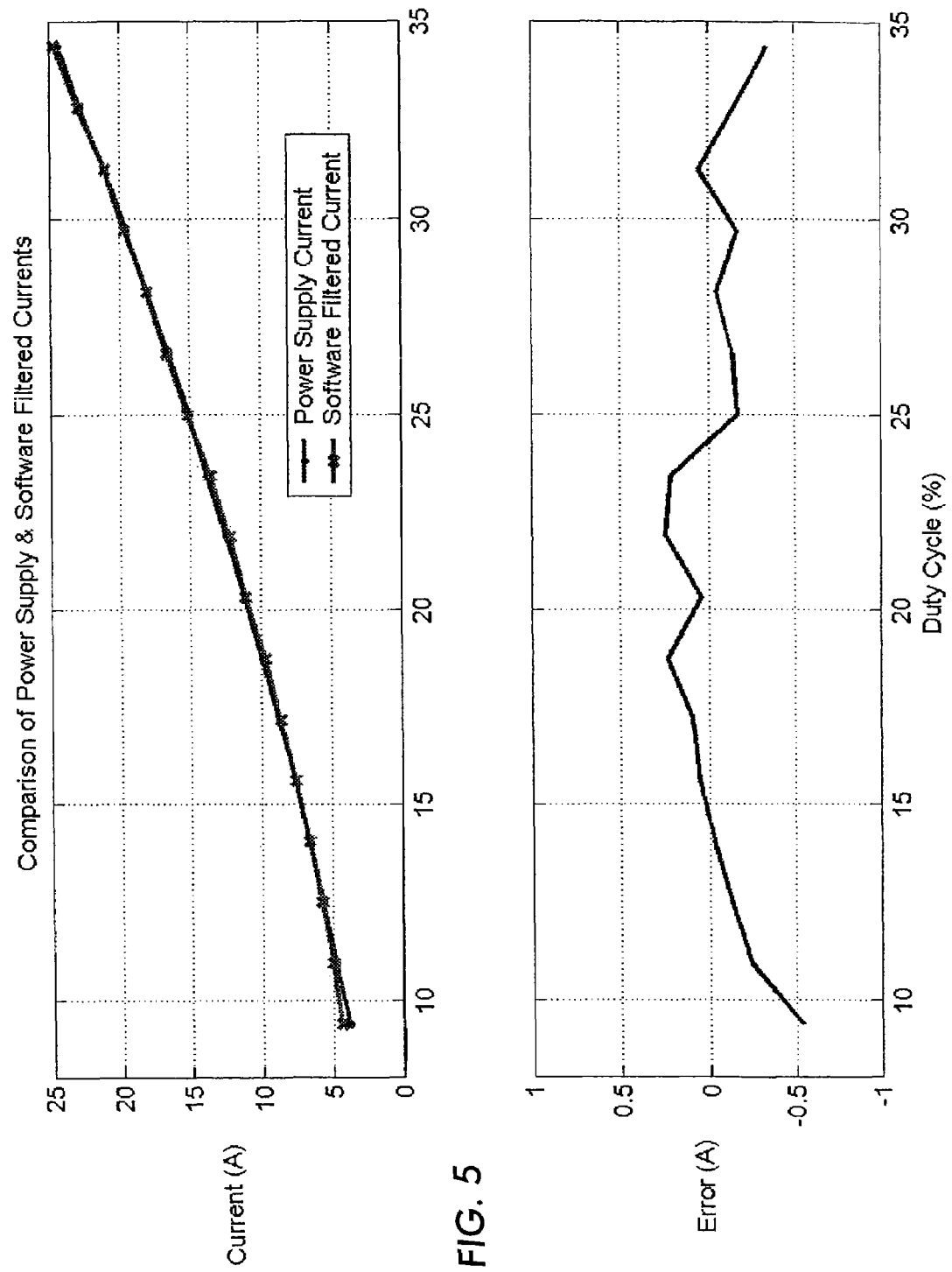
FIG. 5 is a graph of test results showing a correspondence between power supply current and software filtered current.

FIG. 5 shows preliminary results of the filtering scheme. In FIG. 5, the power supply current is effectively the actual motor average current. The software filtered current is the motor average current obtained from the method and apparatus described above.

Although the present invention has been described in relation to particular embodiments thereof, many other variations and modifications and other uses will become apparent to those skilled in the art. Therefore, the present invention is not limited by the specific disclosure herein.

What is claimed is:

1. A method of deriving an average value of a motor current signal comprising pulses and having a predetermined normal duty cycle, comprising the steps of:

A/D converting and sampling peak values of said motor current pulses;

multiplying each said peak value by a Duty value which is related to the duty cycle of said signal;

detecting occurrence of an overcurrent based on said motor current pulses, and in response, setting a reduced duty cycle which is less than said normal duty cycle, and using said reduced duty cycle to calculate said Duty value; and filtering the result of said multiplying step to obtain said average value.

2. A method of deriving an average value of a signal comprising pulses and having a predetermined normal duty cycle, comprising the steps of:

A/D converting and sampling peak values of said pulses;

multiplying each said peak value by a Duty value which is related to the duty cycle of said signal;

filtering the result of said multiplying step; and applying gain and offset calibration values to the result of said filtering step.

3. A method of deriving an average value of a signal comprising pulses and having a predetermined normal duty cycle, comprising the steps of:

A/D converting and sampling peak values of said pulses;

multiplying each said peak value by a Duty value which is related to the duty cycle of said signal; and filtering the result of said multiplying step;

wherein said Duty value is derived as follows:

if the present duty cycle of said pulses is said normal duty cycle, then said normal duty cycle is taken as said Duty value;

if the present duty cycle of said pulses is less than said normal duty cycle, then the quotient of the present duty cycle divided by the normal duty cycle is taken as said Duty value.

4. An apparatus for deriving an average value of a motor current signal comprising pulses and having a predetermined normal duty cycle, wherein said apparatus:

A/D converts and samples peak values of said motor current pulses;

multiplies each said peak value by a Duty value which is related to the duty cycle of said signal;

detecting occurrence of an overcurrent based on said motor current pulses, and in response, setting a reduced duty cycle which is less than said normal duty cycle, and using said reduced duty cycle to calculate said Duty value; and filters the result of said multiplying step to obtain said average value.

5. An apparatus for deriving an average value of a signal comprising pulses and having a predetermined normal duty cycle, wherein said apparatus:
- A/D converts and samples peak values of said pulses;
- multiplies each said peak value by a Duty value which is related to the duty cycle of said signal;
- filters the result of said multiplying step; and
- applies gain and offset calibration values to the result of said filtering step.

6. An apparatus for deriving an average value of a signal comprising pulses and having a predetermined normal duty cycle, wherein said apparatus:
- A/D converts and samples peak values of said pulses;
- multiplies each said peak value by a Duty value which is related to the duty cycle of said signal; and
- filters the result of said multiplying step;
- wherein said Duty value is derived as follows:
  - if the present duty cycle of said pulses is said normal duty cycle, then said normal duty cycle is taken as said Duty value;
  - if the present duty cycle of said pulses is less than said normal duty cycle, then the quotient of the present duty cycle divided by the normal duty cycle is taken as said Duty value.

7. An apparatus for detecting an average motor current and an overcurrent condition in a motor drive circuit, comprising:
- a control circuit which controls the drive circuit to generate drive current pulse having a predetermined normal duty cycle;
- a current sensor for generating a sensed current signal which is representative of said drive current pulses;
- a comparator for receiving said sensed current signal and outputting an overcurrent signal to said control circuit when said sensed current signal exceeds a first threshold; wherein said control circuit further detects said average motor current by:
- A/D converting and sampling peak values of said sensed current signal;
- multiplying each said peak value by a Duty value which is related to the duty cycle of said sensed current signal;
- detecting occurrence of an overcurrent based on said motor current pulses, and in response, setting a reduced duty cycle which is less than said normal duty cycle, and using said reduced duty cycle to calculate said Duty value; and
- filtering the result of said multiplying step to obtain said average motor current.

8. The apparatus of claim 7, wherein said control circuit carries out a first control operation on said motor drive circuit when said sensed circuit signal exceeds said first threshold.

9. A method for detecting an average motor current and an overcurrent condition in a motor drive circuit generating drive current pulses having a predetermined normal duty cycle, comprising the steps of:
- sensing said drive current pulse and generating a sensed current signal based thereon;
- comparing said sensed current signal against a first threshold; and
- outputting an overcurrent signal when said sensed current signal exceeds said first threshold; and
- detecting said average motor current by:
- A/D converting and sampling peak values of said sensed current signal;
- multiplying each said peak value by a Duty value which is related to the duty cycle of said sensed current signal;
- detecting occurrence of an overcurrent based on said motor current pulses, and in response, setting a reduced duty cycle which is less than said normal duty cycle, and using said reduced duty cycle to calculate said Duty value; and
- filtering the result of said multiplying step to obtain said average motor current.

10. The method of claim 9, further comprising carrying out a first control operation on said motor drive circuit when said sensed circuit signal exceeds said first threshold.

11. The apparatus of claim 7, wherein said apparatus further applies gain and offset calibration values to the result of said filtering step.

12. The apparatus of claim 7, wherein said Duty value is derived as follows:
- if the present duty cycle of said pulses is said normal duty cycle, then said normal duty cycle is taken as said Duty value;
- if the present duty cycle of said pulses is less than said normal duty cycle, then the quotient of the present duty cycle divided by the normal duty cycle is taken as said Duty value.

13. The method of claim 9, further comprising the step of applying gain and offset calibration values to the result of said filtering step.

14. The method of claim 9, wherein said Duty value is derived as follows:
- if the present duty cycle of said pulses is said normal duty cycle, then said normal duty cycle is taken as said Duty value;
- if the present duty cycle of said pulses is less than said normal duty cycle, then the quotient of the present duty cycle divided by the normal duty cycle is taken as said Duty value.

* * * * *